(12) United States Patent
Heitplatz et al.

(10) Patent No.: US 10,399,790 B2
(45) Date of Patent: Sep. 3, 2019

(54) CONVEYOR SYSTEM AND METHOD FOR TRANSPORTING OF GOODS ITEMS

(71) Applicant: BEUMER Group GmbH & Co. KG, Beckum (DE)

(72) Inventors: Heino Heitplatz, Drensteinfurt (DE); Jan Josef Jesper, Delbrück (DE)

(73) Assignee: BEUMER Group GmbH & Co. KG, Beckum (DE)

( * ) Notice: Subject to any disclaimer, the term of this patent is extended or adjusted under 35 U.S.C. 154(b) by 0 days.

(21) Appl. No.: 15/918,950

(22) Filed: Mar. 12, 2018

(65) Prior Publication Data
US 2018/0265303 A1 Sep. 20, 2018

(30) Foreign Application Priority Data
Mar. 14, 2017 (EP) ..................................... 17160866

(51) Int. Cl.
*B65G 47/00* (2006.01)
*B65G 47/74* (2006.01)
(Continued)

(52) U.S. Cl.
CPC ................ *B65G 41/02* (2013.01); *B60P 1/38* (2013.01); *B61B 13/00* (2013.01); *B64F 1/368* (2013.01);
(Continued)

(58) Field of Classification Search
None
See application file for complete search history.

(56) References Cited

U.S. PATENT DOCUMENTS 3,662,906 A 5/1972 Christensen
6,540,064 B1 4/2003 Bodewes et al.
(Continued)

FOREIGN PATENT DOCUMENTS

DE 102015001540 8/2015
EP 0630836 12/1994
(Continued)

OTHER PUBLICATIONS

European Search Report for European Application No. 17160866, dated Sep. 29, 2017, 8 pages.

*Primary Examiner* — Kavel Singh
(74) *Attorney, Agent, or Firm* — Ganz Pollard, LLC

(57) ABSTRACT

Conveyor system for the transporting of goods items, with one or more transport units, each of which comprises a load carrying means for accommodating a transport container, the transport units being movable along a conveyor track in or opposite to a direction of conveying, with at least one discharge facility for discharging an empty transport container or one laden with a goods item onto the load carrying means of a transport unit, and at least one retrieval facility for retrieving an empty transport container or one laden with a goods item from a load carrying means of a transport unit, where the transport containers comprise first, or small, transport containers with a first length and a first width, which is smaller than the first length, at least two of which may in each case be accommodated next to one another on a load carrying means of a transport unit with their longitudinal extension transverse to the direction of conveying, and where each transport unit is provided with a first retaining means and each small transport container is provided with a second retaining means, the first retaining means being designed to interact with the second retaining means of one or more small transport containers accommodated transversely to the direction of conveying, and to
(Continued)

restrict movement of a small transport container in or transversely to the direction of conveying relative to the load carrying means in a predetermined measure; and method for the transporting of goods items using the conveyor system.

15 Claims, 12 Drawing Sheets

(51) Int. Cl.
| | | |
|---|---|---|
| B65G 47/02 | (2006.01) | |
| B65G 47/04 | (2006.01) | |
| B65G 47/94 | (2006.01) | |
| B65G 41/02 | (2006.01) | |
| B65G 35/00 | (2006.01) | |
| B64F 1/36 | (2017.01) | |
| B65G 65/00 | (2006.01) | |
| B60P 1/38 | (2006.01) | |
| B65G 35/06 | (2006.01) | |
| B65G 47/34 | (2006.01) | |
| B65G 65/02 | (2006.01) | |
| B61B 13/00 | (2006.01) | |
| B64F 1/32 | (2006.01) | |
| B65G 67/08 | (2006.01) | |

(52) U.S. Cl.
CPC ............ *B65G 35/00* (2013.01); *B65G 35/06* (2013.01); *B65G 47/04* (2013.01); *B65G 47/34* (2013.01); *B65G 65/00* (2013.01); *B65G 65/02* (2013.01); *B64F 1/32* (2013.01); *B65G 67/08* (2013.01); *B65G 2201/0258* (2013.01); *B65G 2201/0264* (2013.01)

(56) References Cited

U.S. PATENT DOCUMENTS

| 7,104,387 B2* | 9/2006 | Brixius | B65G 17/345 |
| | | | 198/370.06 |
| 8,096,402 B2* | 1/2012 | Chastain | B07C 5/36 |
| | | | 198/369.7 |
| 8,386,071 B2* | 2/2013 | Baccini | G01R 31/2893 |
| | | | 198/465.1 |

FOREIGN PATENT DOCUMENTS

| JP | S5831815 | 2/1983 |
| WO | WO 01/05685 | 1/2001 |
| WO | WO 03/026976 | 4/2003 |

* cited by examiner

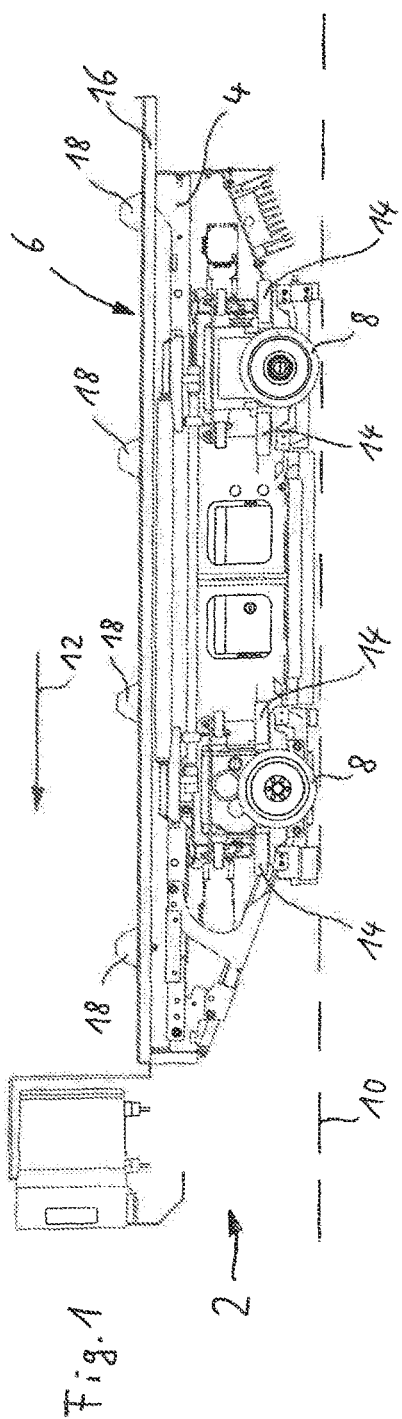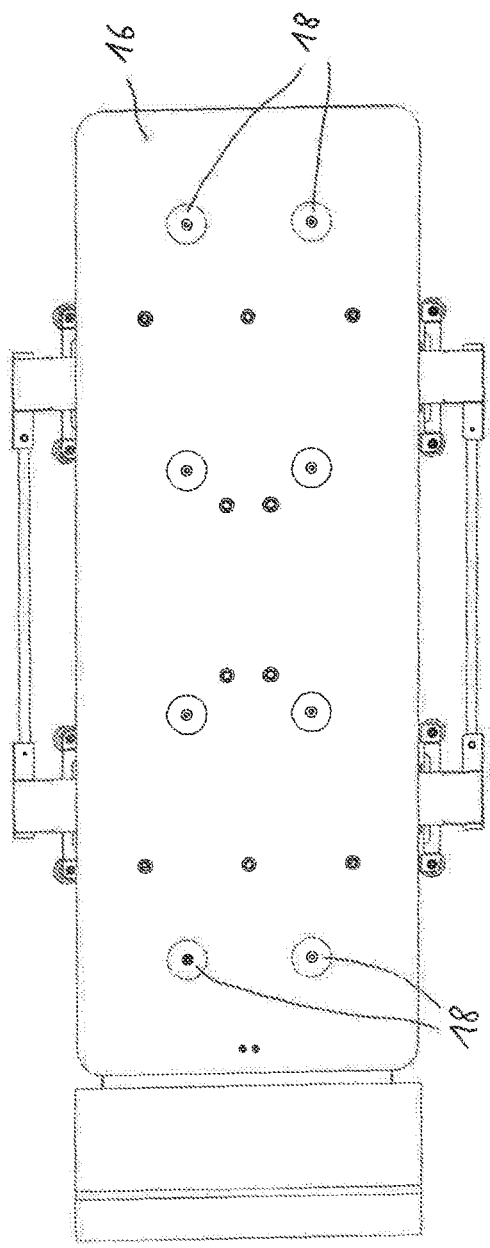

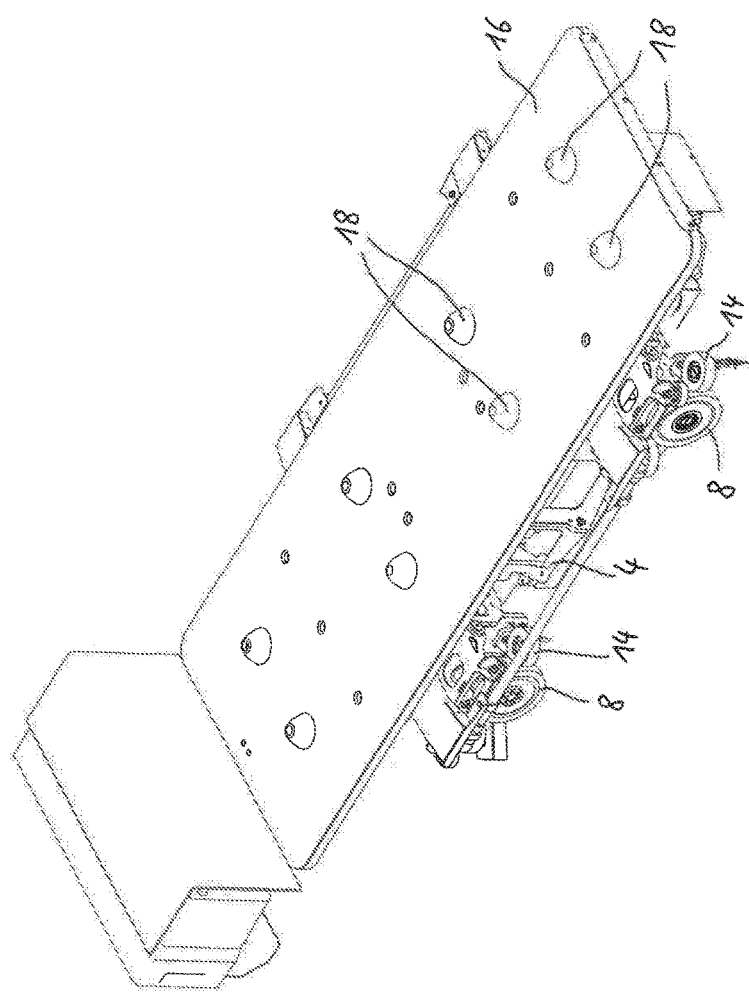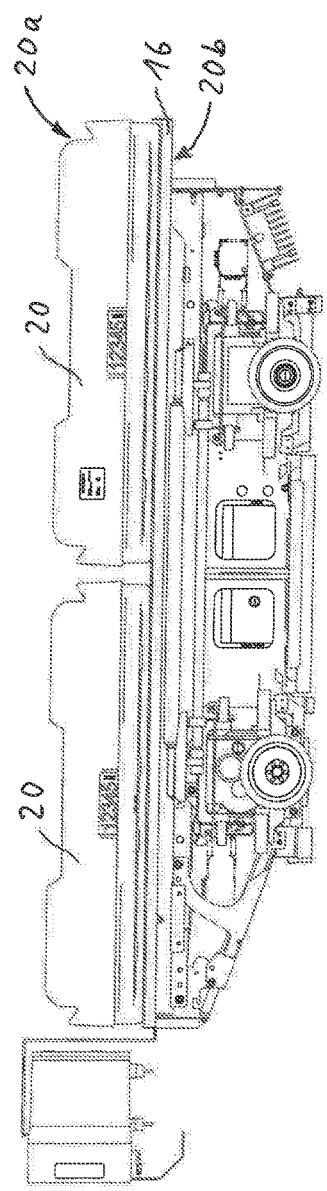

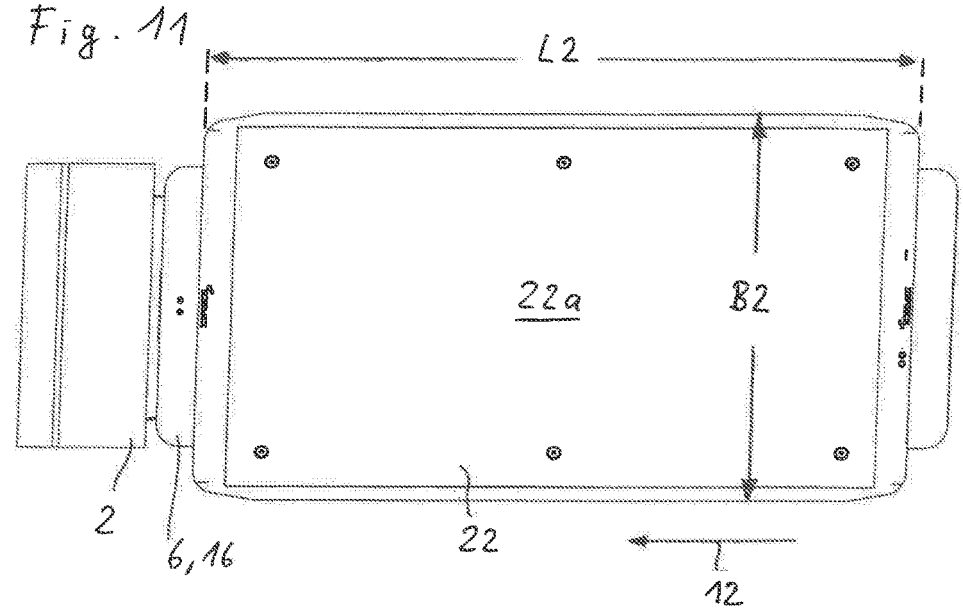
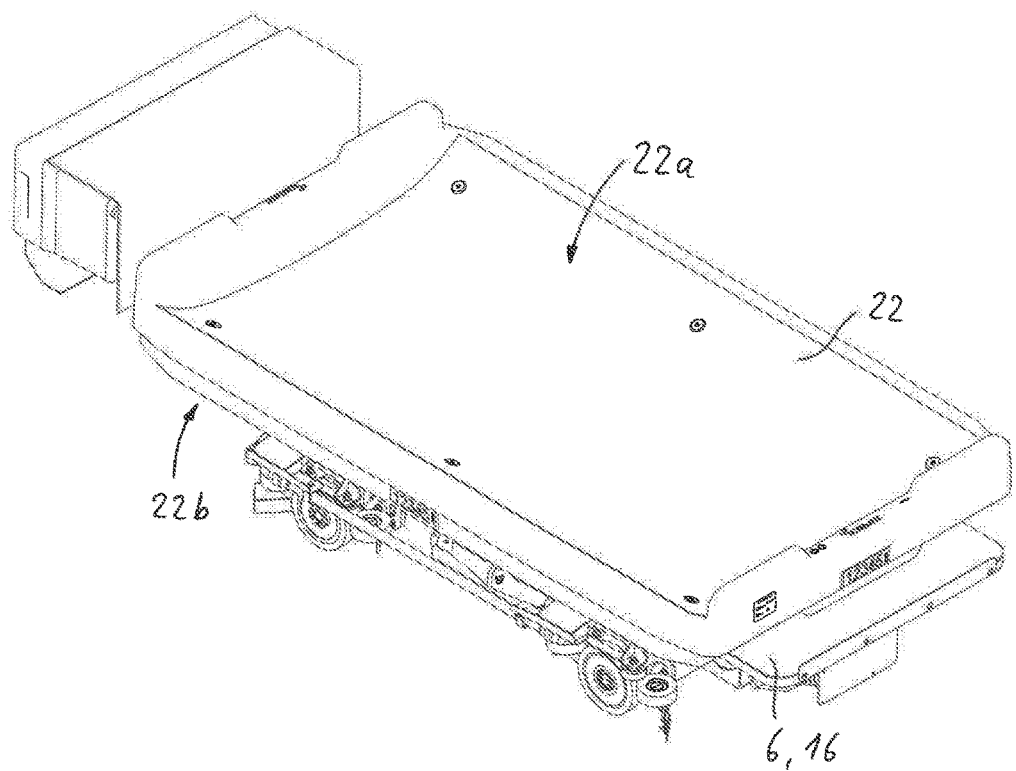

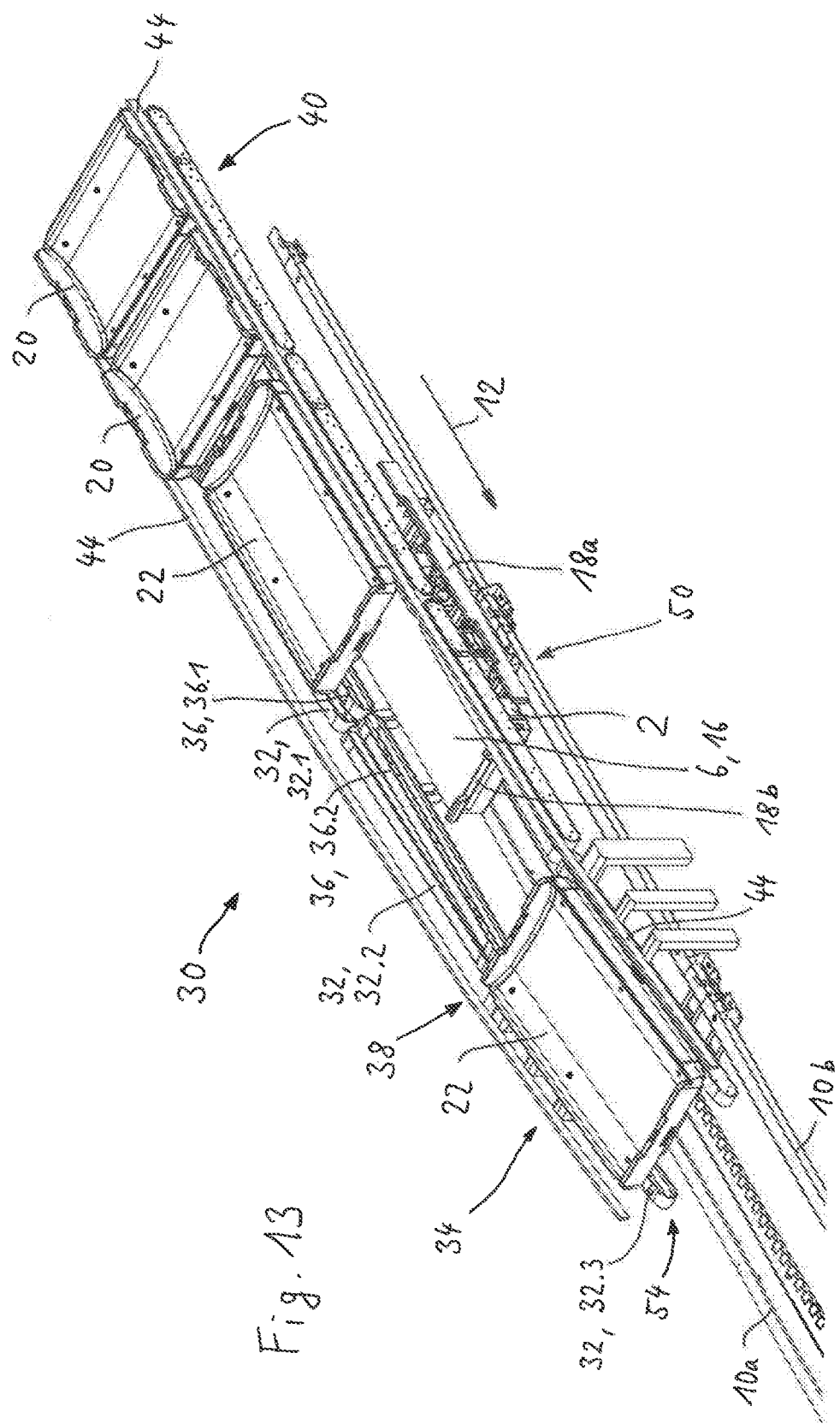

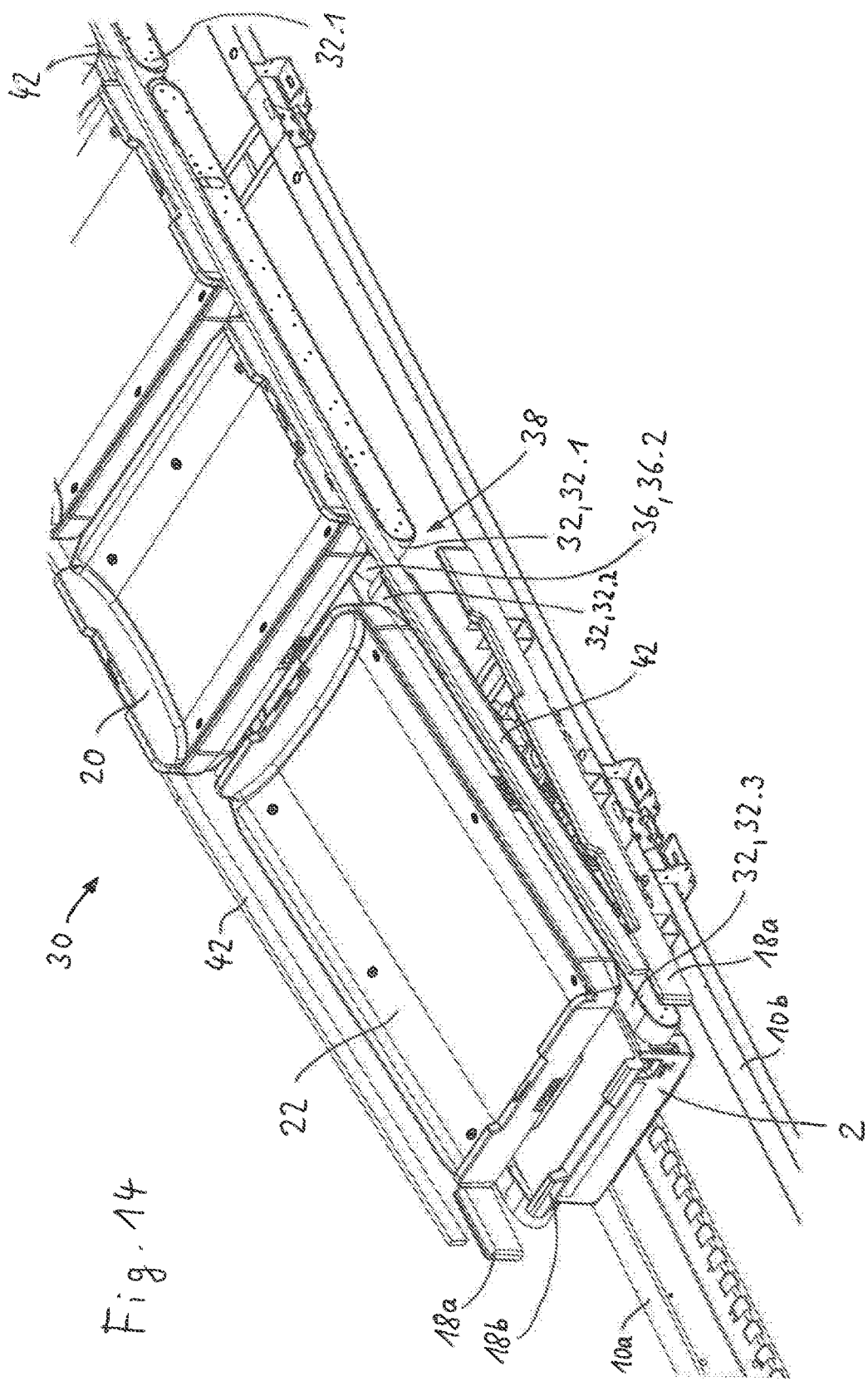

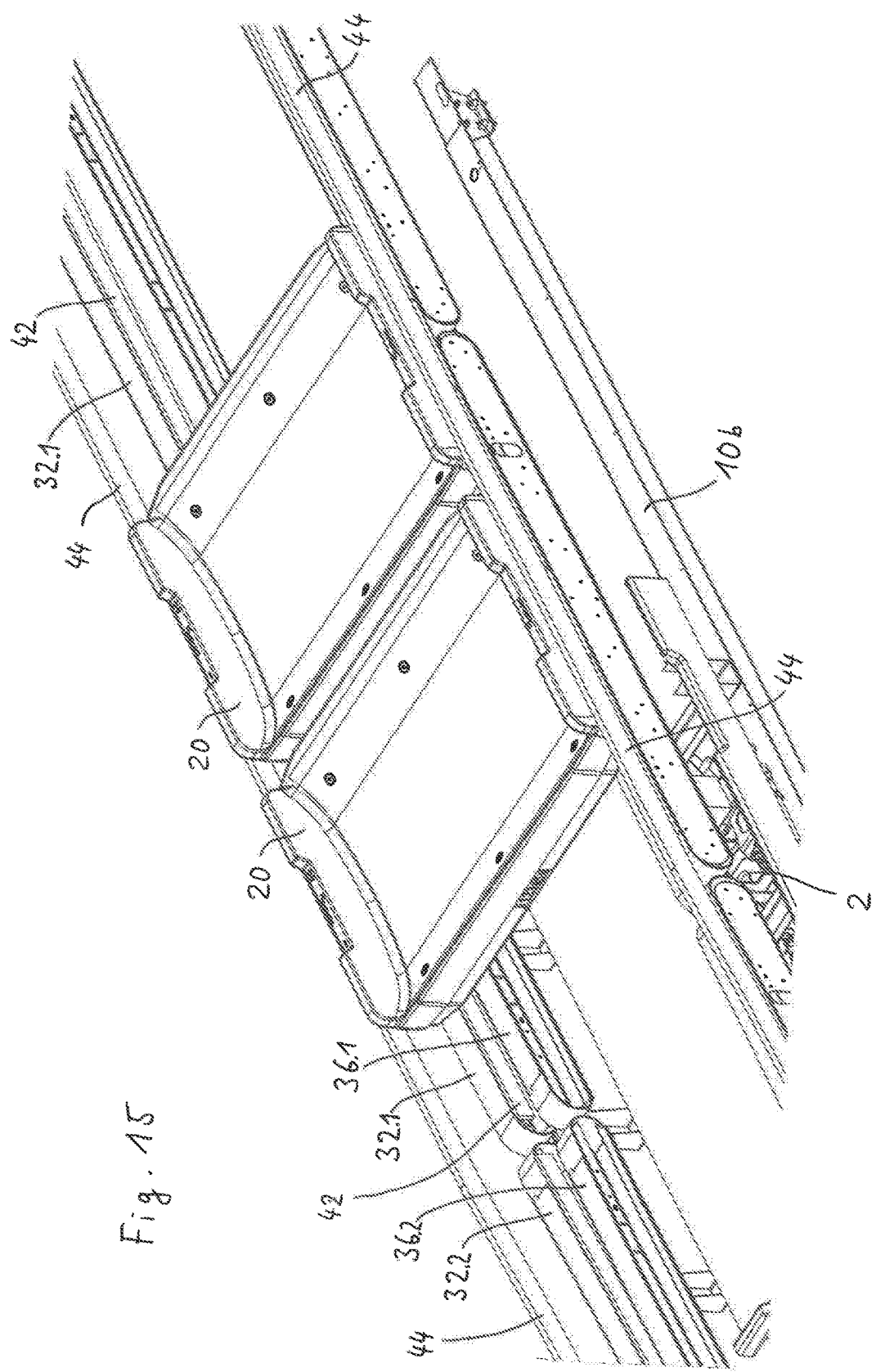

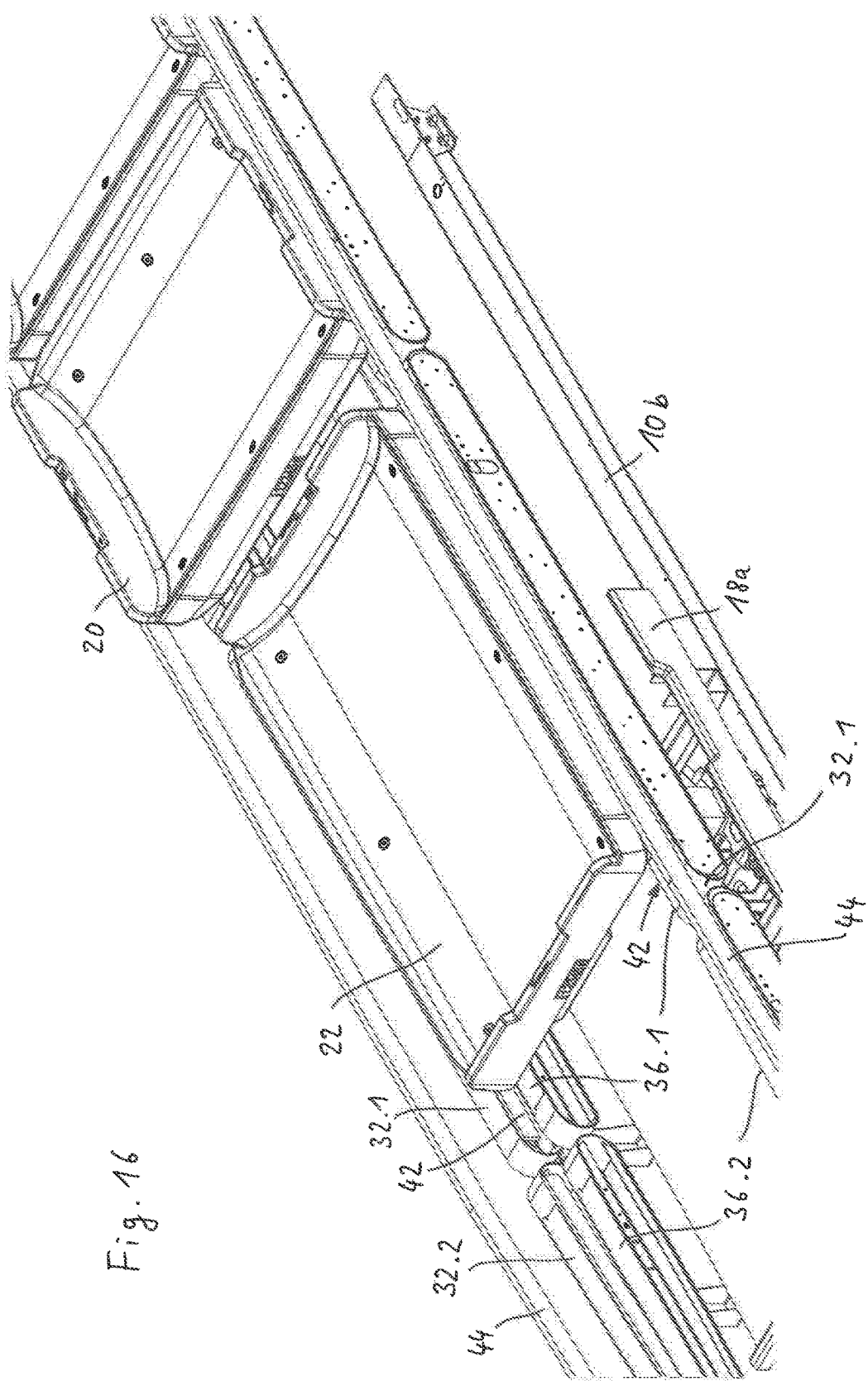

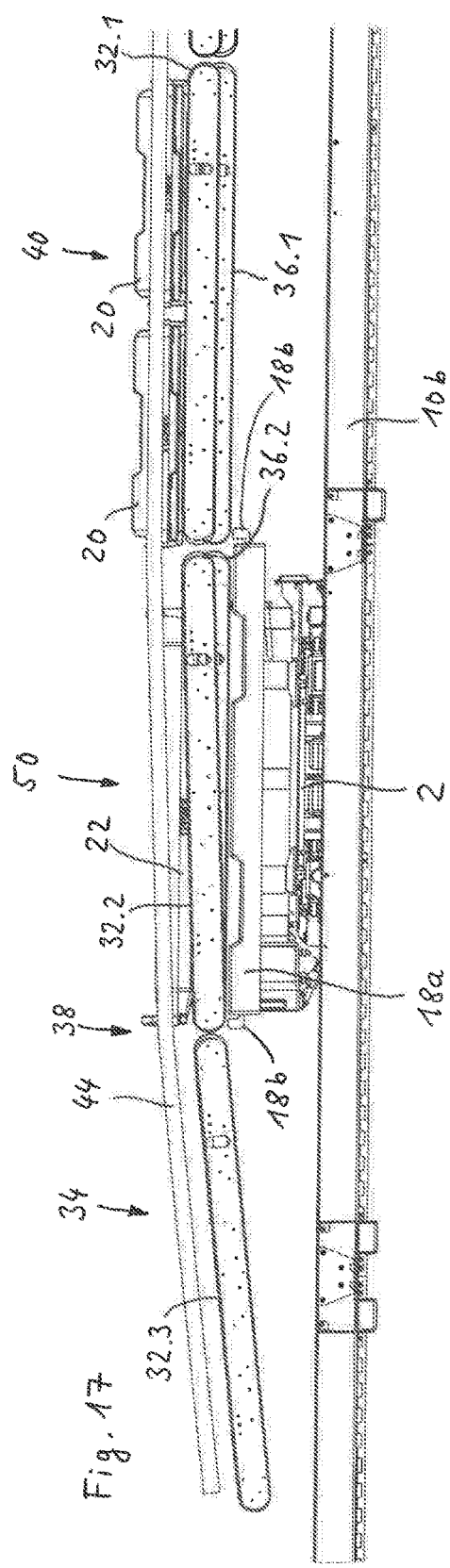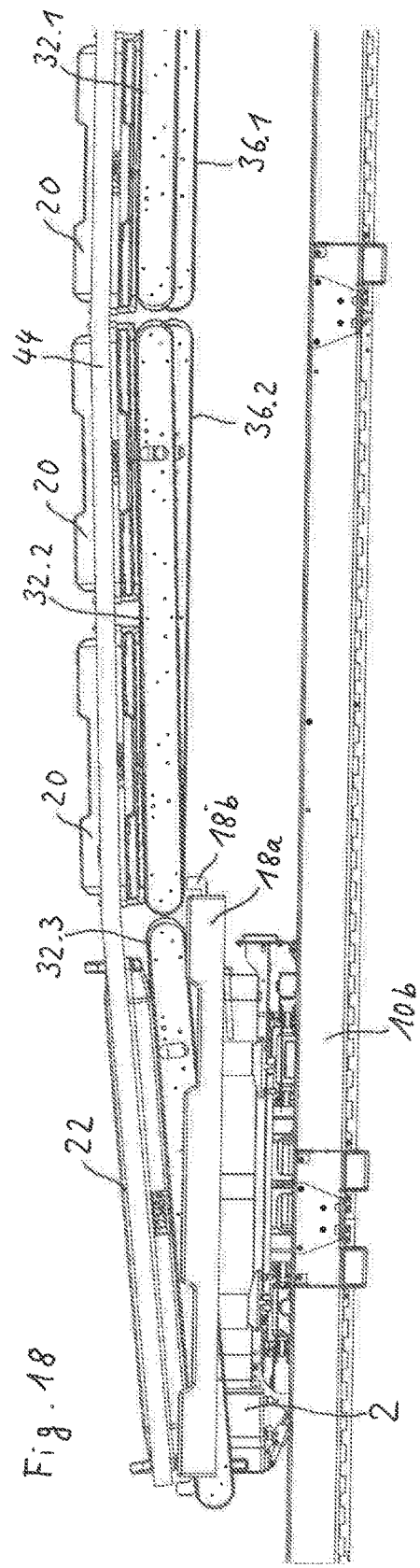

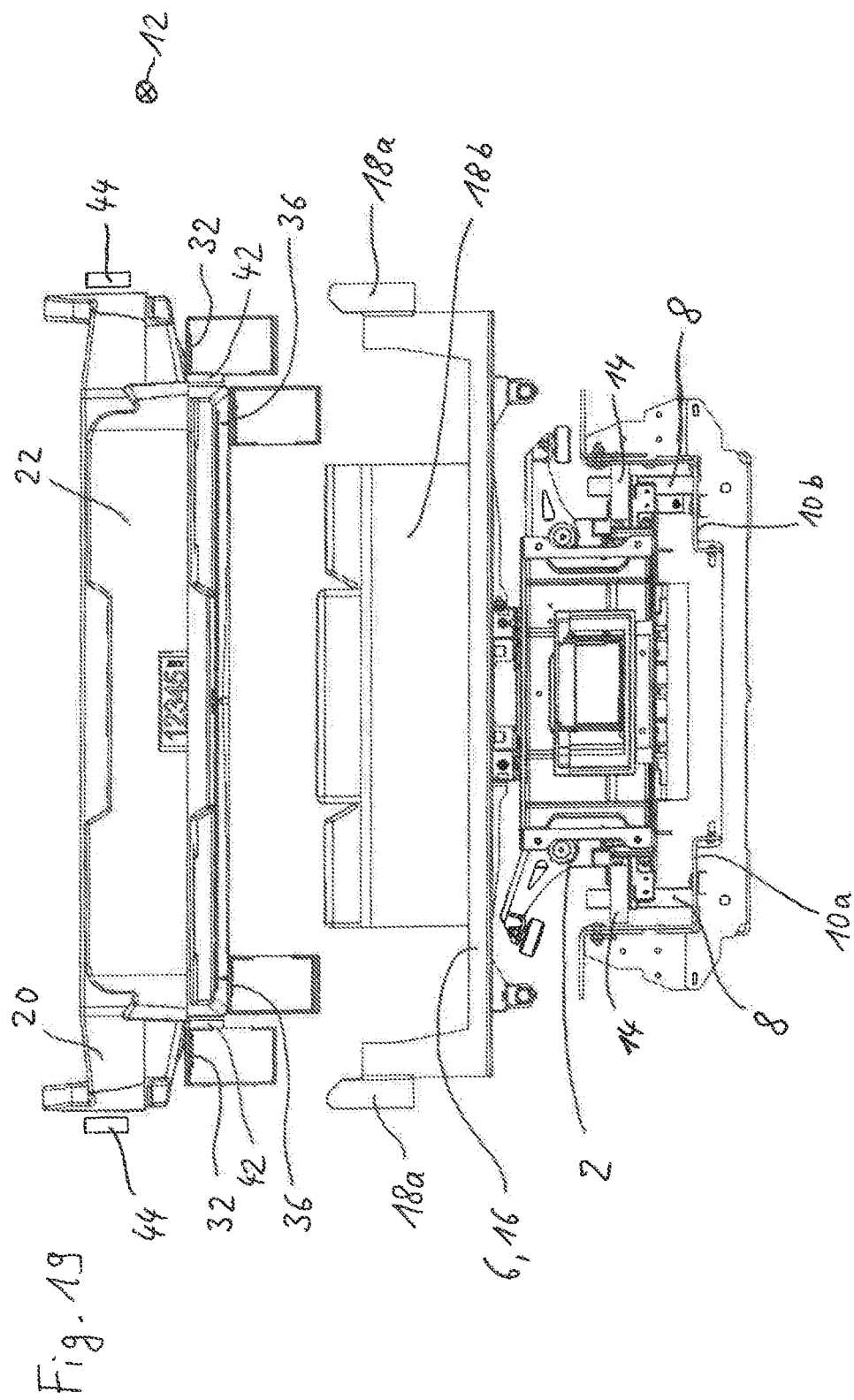

CONVEYOR SYSTEM AND METHOD FOR TRANSPORTING OF GOODS ITEMS

BACKGROUND

The invention relates to a conveyor system for the transporting of goods items, and comprises one or more transport units which are movable along a conveyor track, a discharge facility for discharging transport containers onto transport units and a retrieval facility for retrieving transport containers from transport units, the transport containers each being capable of carrying one goods item, as is the case, for example, with the transportation and sorting of air passenger luggage at airports, and it further relates to a method for transporting goods items using such a conveyor system.

Systems of this type are known, in which transport containers in the form of so-called 'totes' are employed which accommodate the goods items and which in turn are transported on trolleys with side walls and front and rear boundaries. The drawback of these, however, is that the throughput capacity of such a system is relatively low, as each trolley with its transport container or 'tote' is only capable of carrying one piece of luggage. The task of the present invention is to find a remedy for this and to render the system more flexible, in order to increase the throughput capacity.

SUMMARY

According to the invention, this task is solved by means of a conveyor system for the transporting of goods items by one or more conveyor or transport units, each of which comprises a load carrying means for accommodating a transport container, the transport units being movable along a conveyor track in or opposite to the direction of conveying, the system comprising at least one discharge facility for discharging an empty transport container or a transport container laden with a goods item onto the load carrying means of a transport unit, and at least one retrieval facility for retrieving an empty transport container or a transport container laden with a goods item from a load carrying means of a transport unit, where the transport containers consist of first, or small, transport containers with a first length and a first width which is smaller than the first length, at least two of which can in each case be accommodated next to one another on a load carrying means of a transport unit with their longitudinal extension transverse to the direction of conveying, and where each transport unit is provided with a first retaining means and each small transport container is provided with a second retaining means, the first retaining means being designed to interact with the second retaining means of one or more small transport containers accommodated transversely to the direction of conveying and to restrict movement of a small transport container in or transverse to the direction of conveying, and preferably also to restrict rotary movement relative to the load carrying means in a predetermined measure.

It is preferably envisaged that the transport containers also consist of second, or large transport containers with a second length and a second width which is smaller than the second length, such that the second length is greater than the first length and that the second width may be greater than the first width, at least one of which may in each case be accommodated on a load carrying means of a transport unit with its length extension aligned with the direction of conveying, where the first retaining means is designed to interact either with the second retaining means of one or more small transport containers accommodated transversely to the direction of conveying or with the second restraining means of a large transport container accommodated in the direction of conveying, and to restrict movement of a transport container in or transverse to the direction of conveying and preferably also to restrict rotary movement relative to the load carrying means in a predetermined measure. The second width is preferably smaller than the first length.

The conveyor system may comprise at least one first and/or at least one second transport container.

The said measure may amount to several centimeters or several angular degrees or may, where accommodation is interlocking, be practically equal to zero.

The transport containers should preferably be rectangular in plan and have a concave upper side.

In the invention, the use of two different lengths or sizes of transport container has the advantage that one or more, and in particular two, small transport containers, or simply one large transport container, may be transported on a transport unit, so that not just one goods item can be transported on each transport unit, but if necessary more, and in particular two goods items per transport unit.

Although the size of the transport container or 'tote' is essentially freely selectable, it has proved beneficial for the first width to amount to between 20% and 80% or between 40% and 60% of the second length. It may furthermore be an advantage if the first length amounts to between 80% and 200% or between 120% and 150% of the second width.

The first retaining means may be designed for interlocking interaction with the second retaining means.

The first retaining means may consist of first retaining or catch elements projecting vertically upwards from the load carrying means, and the second retaining means may consist of second retaining or catch elements formed complementarily to the first retaining or catch elements. For example, a number of conical projections may be provided on the load carrying means as the first retaining means, whilst corresponding conical recesses may be provided on the underside of the transport containers. The quantity and arrangement of the projections and recesses may be expediently chosen in such a way that two or more small transport containers may be accommodated in an orientation transverse to the direction of conveying, or alternatively one large transport container may be accommodated on the transport unit with its longitudinal extension aligned with the direction of conveying.

The first retaining means may consist of side cheeks running in the direction of conveying, which are capable of interacting interlockingly with the transport containers, perhaps partially engaging with the transport containers, or the clear distance between them is greater than the first length or the second width, whichever is the greater of these two. In this case opposing outer faces of the transport containers may form the second retaining means.

The first retaining means may consist of boundary walls running transversely to the direction of conveying, which interact interlockingly with the transport containers, perhaps partially engaging with the transport containers, or the clear distance between them is greater than a multiple of, and in particular double, the first width, or greater than the second length, whichever is the greater of these two. In this case, too, opposing outer faces of the transport containers may form the second retaining means.

Each transport unit may have a drive motor for movement in or opposite to the direction of conveying.

The conveyor track may be provided with drive means for movement of the transport units in or opposite to the direction of conveying. The drive means may consist of linear drives and/or selectively drivable, sectional endlessly circulating conveyor belts, on which the transport units are conveyed.

The discharge facility may comprise, above the conveyor track, a pair of parallel, spaced and opposing first feed tracks on which small transport containers oriented transversely to the direction of conveying can be conveyed in or opposite to the direction of conveying, which containers can at an end section of the first feed tracks be discharged onto a transport unit travelling thereunder; and, above the conveyor track and below and between the first feed tracks, a pair of parallel, spaced and opposing second feed tracks on which large transport containers oriented in the direction of conveying can be conveyed in or opposite to the direction of conveying, which containers can at the said end sections be discharged onto a transport unit travelling thereunder.

The retrieval facility may comprise, above the conveyor track, a pair of parallel, spaced and opposing first feed tracks on which small transport containers oriented transversely to the direction of conveying can be conveyed in or opposite to the direction of conveying, which containers can at an end section of the first feed tracks be retrieved from a transport unit travelling thereunder; and, above the conveyor track and below and between the first feed tracks, a pair of parallel, spaced and opposing second feed tracks on which large transport containers oriented in the direction of conveying can be conveyed in or opposite to the direction of conveying, which containers can at the said end sections be retrieved from a transport unit travelling thereunder.

Although a single delivery/retrieval facility may be provided, at least one discharge facility and one retrieval facility should preferably be available.

The feed tracks may be formed as belt conveyors, and in particular in sections comprising endlessly circulating conveyor belts, or as roller conveyors.

The second feed tracks may, at a transition point in a transitional section, be brought to a conveying height identical to that of the first feed tracks, so that both small and large transport containers can be conveyed on the first conveyor tracks and from there discharged onto a transport unit travelling thereunder, or vice-versa in reverse direction.

Laterally outside the first feed tracks, guide devices may be disposed for transversely oriented small transport containers, the spacing of which guide devices is greater than the first length.

Inside or between the second feed tracks, guide devices may be disposed for large transport containers oriented in the direction of conveying, the spacing of which guide devices is greater than the second width.

It may be envisaged that the first feed tracks are inclined downwards from the transition point towards an open end, and at an end section thereof so disposed that they are laterally adjacent to a load carrying means of a transport unit travelling thereunder, in such a way that a conveying surface of the feed tracks is disposed at or above the height of the load carrying means. In such a case it may be arranged, if the transport units have side cheeks, that the first feed tracks are disposed in the area of the end section inside or between the side cheeks of a transport unit.

The conveyor system further comprises at least one loading device for the loading of goods items onto transport containers, and at least one unloading device for the unloading of goods items from transport containers. The loading device and/or the unloading device may comprise one sorting conveyor or one each.

In procedural terms, the invention relates to a method for the transporting of goods items using a conveyor system according to the invention, where (1) by means of a discharge facility, at least a first, or smaller transport container, and preferably two or three thereof, transversely oriented to the direction of conveying, is/are discharged onto a load carrying means of a transport unit, and the transport unit is then conveyed to a retrieval facility where the at least one transport container is retrieved, and/or (2) by means of a discharge facility a second, or larger, transport container oriented in the direction of conveying is discharged onto a load carrying means of a transport unit, and the transport unit is then conveyed to a retrieval facility where the at least one transport container is retrieved.

It is expediently envisaged that, depending on the laden weight of a transport unit loaded with at least one transport container, in order to avoid exceeding the weight limit, only one small transport container may be discharged onto a transport unit. In this case it may be arranged that the weight of the goods items which are to be loaded or have been loaded onto the small transport containers, or the weight of the small transport containers loaded with a goods item, is determined prior to discharge onto a transport unit.

BRIEF DESCRIPTION OF THE DRAWINGS

In the following, the invention will be explained in detail on the basis of a particular embodiment with reference to a drawing, where FIGS. 1 to 3 respectively show a lateral, overhead and perspective view of a transport unit for the accommodation of transport containers, FIGS. 4 to 6 respectively show a lateral, overhead and perspective view of a transport unit laden with two small transport containers, FIGS. 7 to 9 respectively show a lateral, overhead and perspective view of a transport unit laden with one small transport container, FIGS. 10 to 12 respectively show a lateral, overhead and perspective view of a transport unit laden with one large transport container, FIG. 13 shows a perspective view of a discharge/retrieval facility for the discharge of transport containers onto transport means or vice-versa, FIG. 14 shows a magnified view of part of the discharge/retrieval facility, FIGS. 15 and 16 respectively show a magnified view of part of the discharge/retrieval facility in association with different transport containers, FIGS. 17 and 18 respectively show lateral views of the discharge/retrieval facility at different stages of a delivery/retrieval process, and FIG. 19 shows a diagrammatic cross-sectional view of the discharge/retrieval facility with a transport unit situated beneath it.

DETAILED DESCRIPTION

Figure 5:
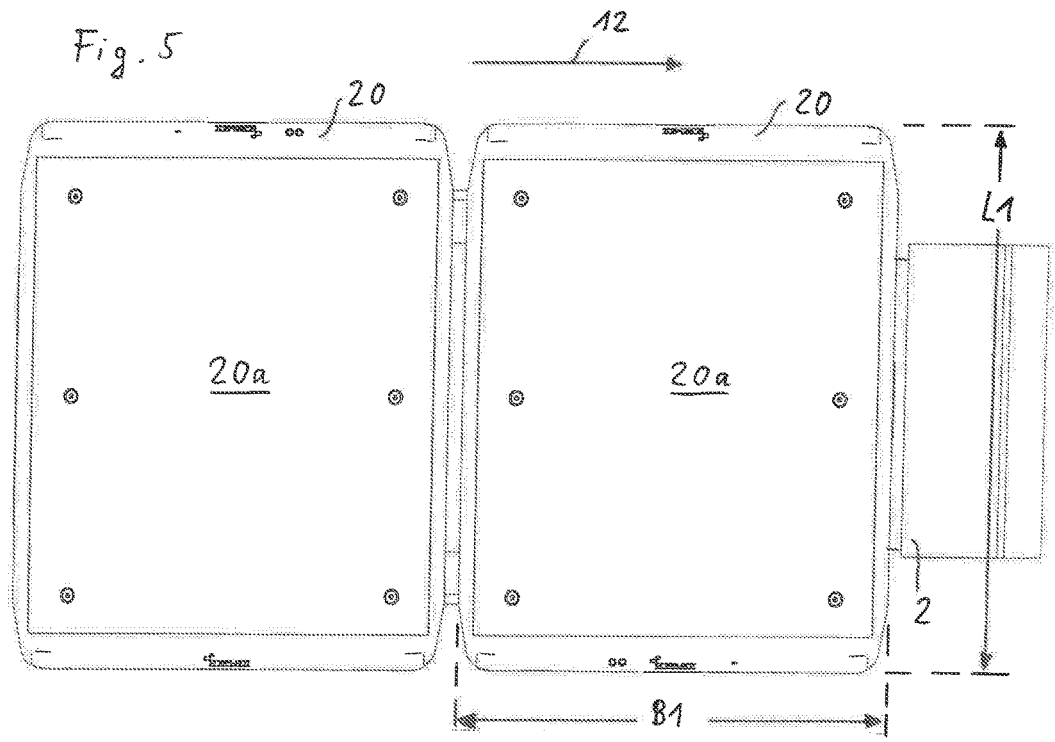

A transport unit 2 illustrated in FIGS. 1 to 3 has an undercarriage 4 and a load carrying means 6 supported thereon for the accommodation of transport containers. On the undercarriage 4 is located a drive motor (not shown in detail), including control and transmission, which is in drive connection with track wheels 8, which run along a conveyor track, schematically represented by 10. The conveyor track may comprise two parallel running rails 10a, b (FIG. 19). The transport unit 2 may be driven in or opposite to a direction of conveying 12. For sideways guidance transverse to the direction of conveying 12, transport unit 2 is provided, in front of and behind each track wheel 8, with guide wheels 14, the rotational axis of which is perpendicular to a rotational axis of the track wheels 8. More specifically, the rotational axes of the track wheels 8 should preferably be horizontal and the rotational axes of the guide wheels 14 preferably vertical. Each pair of track wheels 8 may be arranged on a common rotational axis with a total of four guide wheels 14 on a bogie, which may be rotatable around a vertical axis.

In the illustrated embodiment, the load carrying means 6 is formed by a flat plate 16, on which a first retaining means is provided in the form of eight conical or frusto-conical retaining elements 18 arranged in a grid pattern. The retaining elements 18 may for example be bolted to the plate 16.

Figure 6:
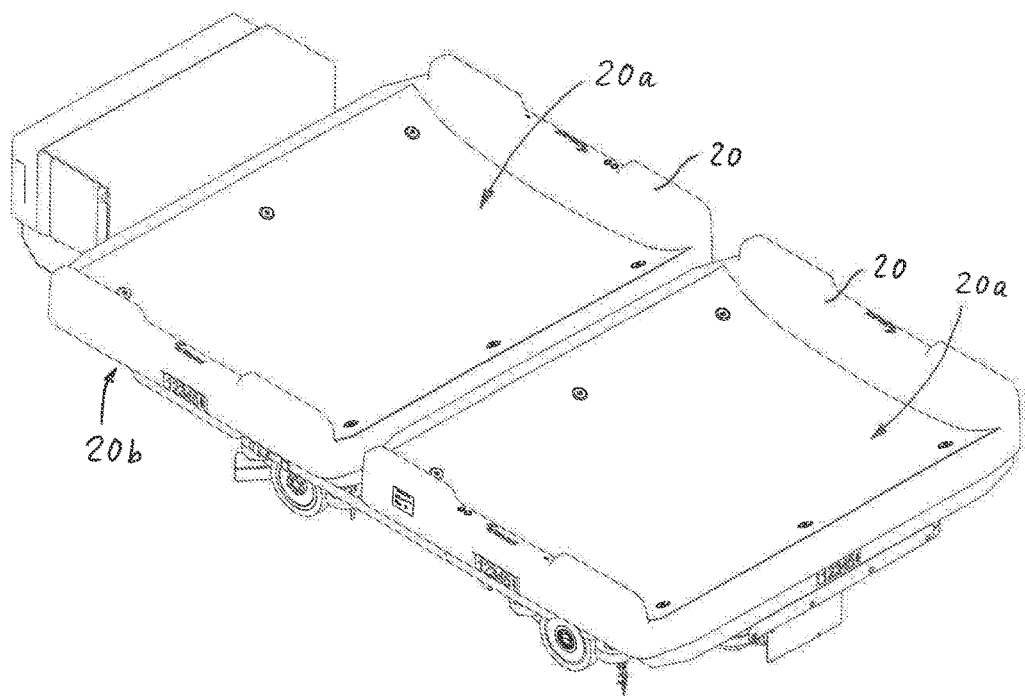

FIGS. 4 to 6 all show the transport unit 2 laden with two small transport containers 20. Each small transport container 20 represents a first of two different sizes of transport container which can be accommodated on a transport unit 2 and has a first length L1 and a first width B1 which is smaller than first length L1. Each small transport container 20 comprises an upper side 20a for accommodation of a goods item and an opposing underside 20b, on which a second retaining means (not illustrated) is disposed. The second retaining means is formed for interaction, and in particular interlocking interaction, with the first retaining means 18, and in the embodiment illustrated is provided in the form of four conical or frusto-conical recesses arranged in a grid pattern.

In the situation illustrated in FIGS. 4 to 6, four first retaining elements 18 are respectively accommodated in four corresponding second retaining elements having the form of conical recesses in a transport container 20, so that the latter is secured in horizontal direction against displacement and twisting.

Figure 7:
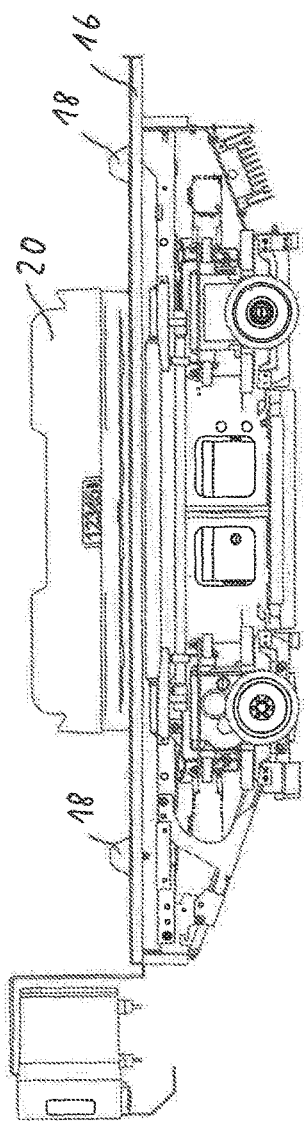
Figure 8:
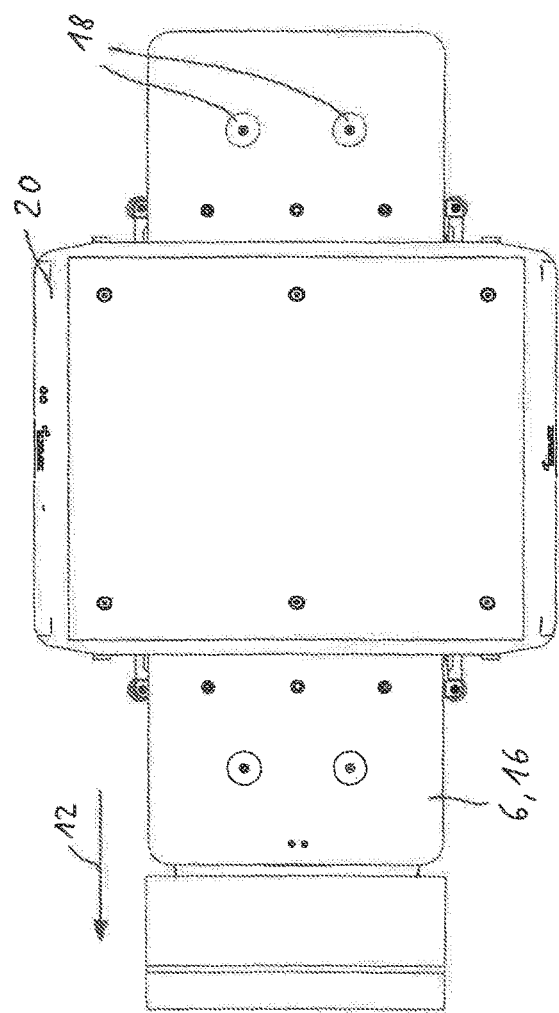
Figure 9:
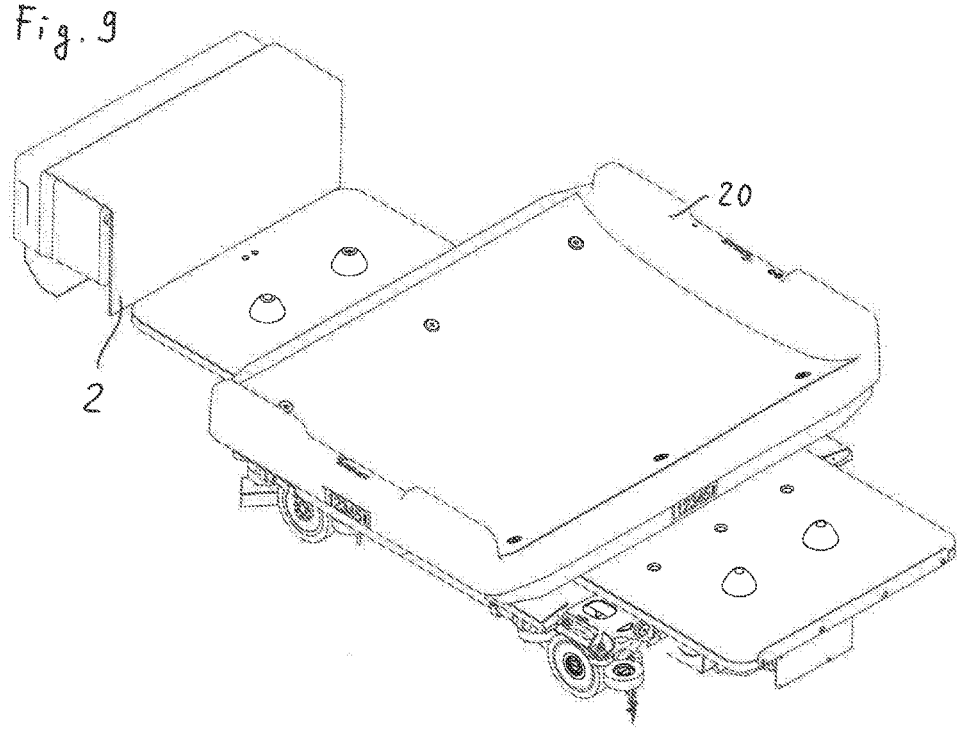

FIGS. 7 to 9 show a further possible method of accommodating a single small transport container 20 on a transport unit 2, where the small transport container 20 is for example centrally disposed on the load carrying means 6. Alternatively, the transport container 20 could be situated at the front or rear of the load carrying means 6 in terms of the direction of travel. In either case, it is preferable for either one or two small transport containers 20 to be accommodated crosswise, in such a way that a longitudinal extension of the transport container(s) is oriented transversely to the direction of conveying 12.

Figure 10:
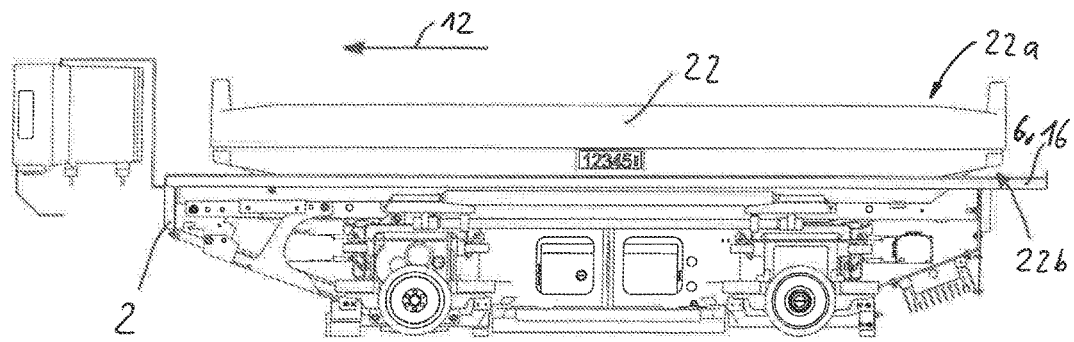

FIGS. 10 to 12 illustrate how a single large transport container 22 is accommodated on a transport unit 2. The large transport container 22 represents a second of two different sizes of transport container which can be accommodated and transported on a transport unit 2. The large transport container 22 comprises an upper side 22a for accommodation of large goods items and an opposing underside 22b, which rests on the load carrying means 6. The large transport container 22 has a second length L2 and a second width B2. On its underside 22b, the large transport container 22 has a second retaining means for interaction with the first retaining means 18 on the load carrying means 6, so that the second retaining means in the embodiment illustrated consists of eight conical or frusto-conical recesses arranged in a grid pattern, which interact interlockingly with the first retaining elements 18.

FIGS. 13 to 19 serve to illustrate the design and operating principle of a delivery/retrieval facility 30 for discharging transport containers onto a transport unit and/or retrieving transport containers from a transport unit, the transport units illustrated representing an embodiment including side cheeks 18a and front and rear boundary walls 18b as first retaining means.

The discharge/retrieval facility 30 comprises, above the conveyor track 10, a pair of parallel, spaced and opposing first feed tracks 32 on which small transport containers 20, transversely oriented to the direction of conveying 12, can be conveyed in or opposite to the direction of conveying 12, and can, at a downwards inclined end section 34, be discharged onto a transport unit 2 travelling thereunder or conversely can be retrieved therefrom. The first feed tracks 32 consist of sectional belt conveyors 32.1, 32.2, 32.3, which are selectively drivable and respectively comprise a pair of endlessly circulating belts.

The discharge/retrieval facility 30 further comprises, above the conveyor track 10, a pair of parallel, spaced and opposing second feed tracks 36 below and between the first feed tracks 32, on which large transport containers 22 oriented in the direction of conveying 12 can be conveyed in or opposite to the direction of conveying 12 and can, at the end section 34, be discharged onto a transport unit 2 travelling thereunder. The second feed tracks 36 consist of sectional belt conveyors 36.1, 36.2, which are selectively drivable and respectively comprise an endlessly circulating conveyor belt.

In the embodiment illustrated, the large transport containers 22 cannot be directly discharged from the second feed tracks 36 onto a transport unit 2, or conversely retrieved therefrom, but the second feed tracks 36 are, at a transition point 38 in the end section 34, brought to the same conveying height as the first feed tracks 32, so that both small and large transport containers 20, 22 can be conveyed onto the first feed tracks 32 in the end section 34, or vice-versa, and can be discharged from the first feed tracks 32 onto the transport unit 2 travelling thereunder, or vice-versa.

The discharge/retrieval facility 30 thus comprises three different sections over which the first and second feed tracks 32, 36 extend. In a transport section 40 which, unlike the end section 34, may cover any desired length and form a link to a further delivery/retrieval facility, to loading and unloading equipment for goods items, to storage stations for transport containers and to branches and the like, the second feed tracks 36 run, as explained above, below and between the first feed tracks 32. The distance between the second feed tracks 36 is adjusted to the second width B2 of the large transport containers 22 in such a way that these are supported by their longitudinal edge regions on the second feed tracks 36 and, guided by these, can be moved in or opposite to the direction of conveying 12. In order to prevent the large transport containers 22 from slipping in lateral direction or transversely to the direction of conveying 12, lateral guide elements 42 in the form of guide rails or similar are provided between the second feed tracks 36 and the first feed tracks 32 which lie further outwards and above, the distance between these lateral guide elements being somewhat greater than the second width B2.

On the first feed tracks 32 the small transport containers 20 can be accommodated transversely to the direction of conveying 12 and thus transported in such a way that the small transport containers 20 are supported by their front and rear ends, viewed in container width direction, on the first feed tracks 32, the distance between which being adjusted to the first length L1 of the small transport container 20. In order to prevent the small transport container 20 from slipping in lateral direction or transversely to the direction of conveying 12, lateral guide elements 44 in the form of guide rails or similar are provided laterally adjacent to and slightly above a conveying surface of the first feed tracks 32, the distance between these lateral guide elements being somewhat greater than the first length L1 of the small transport container 20.

FIG. 13 shows the conveyance of different transport containers 20, 22, whilst FIG. 15 shows the conveyance of two small transport containers 20 on first feed tracks 32, and FIGS. 14 and 16 also illustrate the conveyance and delivery/retrieval of a large transport container 22.

FIGS. 17 and 18 show two sequential stages of the discharge of a large transport container 22 onto a transport unit 2. During discharge onto the load carrying means, the small or large transport container 20, 22 and the transport unit 2 are moved at the same speed and in vertical alignment with each other. This means that the transport container is deposited vertically from above onto the load carrying means. The container retrieval process occurs in reverse order.

Between the transport section 40 and the end section 34 lies a transitional section 50, which ends at a transition point 38 and within which the first and second feed tracks 32, 36 are approximated vertically until their conveying surfaces eventually lie at the same height at the transition point 38. The second feed tracks 36 end and begin at the transition point 38.

Next to the transitional area 50 the discharge/retrieval facility 30 has the above-mentioned end section 34, which is expediently inclined downwards towards the conveyor track 10. The first feed tracks 32 extend up to and from an open end 54 of the end section 34.

FIG. 19 shows a cross-sectional diagram with a small transport container 20, transversely oriented and conveyed on the first feed tracks 32, and a large transport container 22, oriented in the direction of conveying 12 and conveyed on the second feed tracks 36.

The invention claimed is:

1. A conveyor system for the transporting of goods items, comprising
at least one first, or small, transport container having a first length and a first width, which is smaller than the first length,
at least one second, or large, transport container having a second length and a second width, which is smaller than the second length, where the second length is greater than the first length and the second width may be greater than the first width,
one or more transport units, each of which comprises a load carrying means for accommodating a transport container, the transport units being movable along a conveyor track in or opposite to a direction of conveying,
at least one discharge facility for discharging an empty transport container or one laden with a goods item onto the load carrying means of a transport unit,
at least one retrieval facility for retrieving an empty transport container or one laden with a goods item from a load carrying means of a transport unit, where at least two of the first containers may in each case be accommodated next to one another on a load carrying means of a transport unit with their longitudinal extension transverse to the direction of conveying, or one second container may in each case be accommodated on a load carrying means of a transport unit with its length extension in the direction of conveying, and where each transport unit is provided with a first retaining means and each transport container is provided with a second retaining means, the first retaining means being designed to interact either with the second retaining means of one or more first transport containers accommodated transversely to the direction of conveying, or with the second retaining means of a second transport container accommodated in the direction of conveying, and to restrict movement of a transport container in or transverse to the direction of conveying relative to the load carrying means in a predetermined measure, and wherein the first retaining means and the second retaining means are designed in such a way that either several, and in particular two, transversely oriented small transport containers or one longitudinally oriented large transport container can be accommodated on the load carrying means, so that the first retaining means interacts interlockingly with the second retaining means.

2. The conveyor system in accordance with claim 1, wherein the first retaining means is designed to interact interlockingly with the second retaining means.

3. The conveyor system in accordance with claim 1, wherein the first retaining means comprises first retaining or catch elements projecting vertically upwards from the load carrying means.

4. The conveyor system in accordance with claim 1, wherein the second retaining means is formed complementarily to the first retaining means and may comprise second retaining elements formed complementarily to the first retaining elements.

5. The conveyor system in accordance with claim 1, wherein the discharge facility comprises a pair of parallel, spaced first feed tracks, disposed opposite each other and above the conveyor track, on which small transport containers oriented transversely to the direction of conveying can be conveyed in or opposite to the direction of conveying and can at an end section of the first feed tracks be discharged onto a transport unit travelling thereunder, and a pair of parallel, spaced second feed tracks, disposed opposite each other below and between the first feed tracks and above the conveyor track, on which large transport containers oriented in the direction of conveying can be conveyed in or opposite to the direction of conveying and can at the end sections be discharged onto a transport unit travelling thereunder.

6. The conveyor system in accordance with claim 5, wherein the second feed tracks are at a transition point in a transitional section brought to a conveying height identical to that of the first feed tracks.

7. The conveyor system in accordance with claim 5, wherein laterally outside the first feed tracks guide devices are disposed for transversely oriented small transport containers, the distance between which is greater than the first length.

8. The conveyor system in accordance with claim 5, wherein inside or between the second feed tracks guide devices are disposed for large transport containers oriented in the direction of conveying, the distance between which is greater than a second width of the larger transport containers, the second width may be greater than the first width.

9. The conveyor system in accordance with claim 1, wherein the retrieval facility comprises a pair of parallel, spaced first feed tracks, disposed opposite each other and above the conveyor track, on which small transport containers oriented transversely to the direction of conveying can be conveyed in or opposite to the direction of conveying and can at an end section of the first feed tracks be retrieved from a transport unit travelling thereunder, and a pair of parallel, spaced second feed tracks, disposed opposite each other below and between the first feed tracks and above the conveyor track, on which large transport containers oriented in the direction of conveying can be conveyed in or opposite to the direction of conveying and can at the end sections be retrieved from a transport unit travelling thereunder.

10. The conveyor system in accordance with claim 1, wherein the conveyor system includes at least one first transport container and at least one second transport container.

11. A conveyor system for the transporting of goods items, comprising
at least one first, or small, transport container having a first length and a first width, which is smaller than the first length,
at least one second, or large, transport container having a second length and a second width, which is smaller than the second length, where the second length is greater than the first length and the second width may be greater than the first width,
one or more transport units, each of which comprises a load carrying means for accommodating a transport container, the transport units being movable along a conveyor track in or opposite to a direction of conveying,
at least one discharge facility for discharging an empty transport container or one laden with a goods item onto the load carrying means of a transport unit,
at least one retrieval facility for retrieving an empty transport container or one laden with a goods item from a load carrying means of a transport unit, where at least two of the first containers may in each case be accommodated next to one another on a load carrying means of a transport unit with their longitudinal extension transverse to the direction of conveying, or one second container may in each case be accommodated on a load carrying means of a transport unit with its length extension in the direction of conveying, and where each transport unit is provided with a first retaining means and each transport container is provided with a second retaining means, the first retaining means being designed to interact either with the second retaining means of one or more first transport containers accommodated transversely to the direction of conveying, or with the second retaining means of a second transport container accommodated in the direction of conveying, and to restrict movement of a transport container in or transverse to the direction of conveying relative to the load carrying means in a predetermined measure, and wherein the first retaining means comprises side cheeks running in the direction of conveying, the clear distance between which may be greater than the first length or the second width, whichever is the greater of these two measures, and/or boundary walls running transversely to the direction of conveying, the clear distance between which may be greater than a multiple of, and in particular double, the first width or greater than the second length, whichever is the greater of these two measures.

12. A method for the transporting of goods items using a conveyor system comprising:
moving one or more transport units, each of which comprises a load carrying means for accommodating a transport container, the transport units being movable along a conveyor track in or opposite to a direction of conveying, with at least one discharge facility for discharging an empty transport container or one laden with a goods item onto the load carrying means of a transport unit, and at least one retrieval facility for retrieving an empty transport container or one laden with a goods item from a load carrying means of a transport unit, where the transport containers comprise first, or small, transport containers with a first length and a first width, which is smaller than the first length, and large, or second transport containers with a second length and a second width, which is smaller than the second length, where the second length is greater than the first length and the second width may be greater than the first width, where at least two of the first containers may in each case be accommodated next to one another on a load carrying means of a transport unit with their longitudinal extension transverse to the direction of conveying, or one second container may in each case be accommodated on a load carrying means of a transport unit with its length extension in the direction of conveying, and where each transport unit is provided with a first retaining means and each transport container is provided with a second retaining means, the first retaining means being designed to interact with the second retaining means of one or more first transport containers accommodated transversely to the direction of conveying, or with the second retaining means of a second transport container accommodated in the direction of conveying, and to restrict movement of a transport container in or transverse to the direction of conveying relative to the load carrying means in a predetermined measure;
discharging at a discharge facility at least a first transport container transversely oriented to the direction of conveying onto a load carrying means of a transport unit, or a second transport container oriented in the direction of conveying onto the load carrying means of the transport unit; and
driving the transport unit to a retrieval facility where the at least one transport container is retrieved, wherein the first retaining means and the second retaining means are designed in such a way that either several, and in particular two, transversely oriented small transport containers or one longitudinally oriented large transport container can be accommodated on the load carrying means, so that the first retaining means interacts interlockingly with the second retaining means.

13. The method in accordance with claim 12, comprising:
discharging at least the first transport container onto a load carrying means of a first transport unit;
discharging the second transport container onto a load carrying means of a second transport unit; and
driving the first and second transport units to the retrieval facility where the first and second transport containers are retrieved.

14. The method in accordance with claim 12, wherein, depending on a permissible laden weight of a transport unit loaded with at least one transport container, in order to avoid exceeding the weight limit, only one small transport container is discharged onto a transport unit, in which case the weight of the goods items which are to be loaded or have been loaded onto the small transport containers, or the weight of the small transport containers loaded with goods items, can be determined prior to discharge onto a transport unit.

15. A method for the transporting of goods items using a conveyor system comprising:
moving one or more transport units, each of which comprises a load carrying means for accommodating a transport container, the transport units being movable along a conveyor track in or opposite to a direction of conveying, with at least one discharge facility for discharging an empty transport container or one laden with a goods item onto the load carrying means of a transport unit, and at least one retrieval facility for retrieving an empty transport container or one laden with a goods item from a load carrying means of a transport unit, where the transport containers comprise first, or small, transport containers with a first length and a first width, which is smaller than the first length, and large, or second transport containers with a second length and a second width, which is smaller than the second length, where the second length is greater than the first length and the second width may be greater than the first width, where at least two of the first containers may in each case be accommodated next to one another on a load carrying means of a transport unit with their longitudinal extension transverse to the direction of conveying, or one second container may in each case be accommodated on a load carrying means of a transport unit with its length extension in the direction of conveying, and where each transport unit is provided with a first retaining means and each transport container is provided with a second retaining means, the first retaining means being designed to interact with the second retaining means of one or more first transport containers accommodated transversely to the direction of conveying, or with the second retaining means of a second transport container accommodated in the direction of conveying, and to restrict movement of a transport container in or transverse to the direction of conveying relative to the load carrying means in a predetermined measure;

discharging at a discharge facility at least a first transport container transversely oriented to the direction of conveying onto a load carrying means of a transport unit, or a second transport container oriented in the direction of conveying onto the load carrying means of the transport unit;

driving the transport unit to a retrieval facility where the at least one transport container is retrieved; and wherein the first retaining means comprises side cheeks running in the direction of conveying, the clear distance between which may be greater than the first length or the second width, whichever is the greater of these two measures, and/or boundary walls running transversely to the direction of conveying, the clear distance between which may be greater than a multiple of, and in particular double, the first width or greater than the second length, whichever is the greater of these two measures.

* * * * *